Sept. 27, 1932.  C. DENNIS  1,879,925
RAKE
Filed March 14, 1930
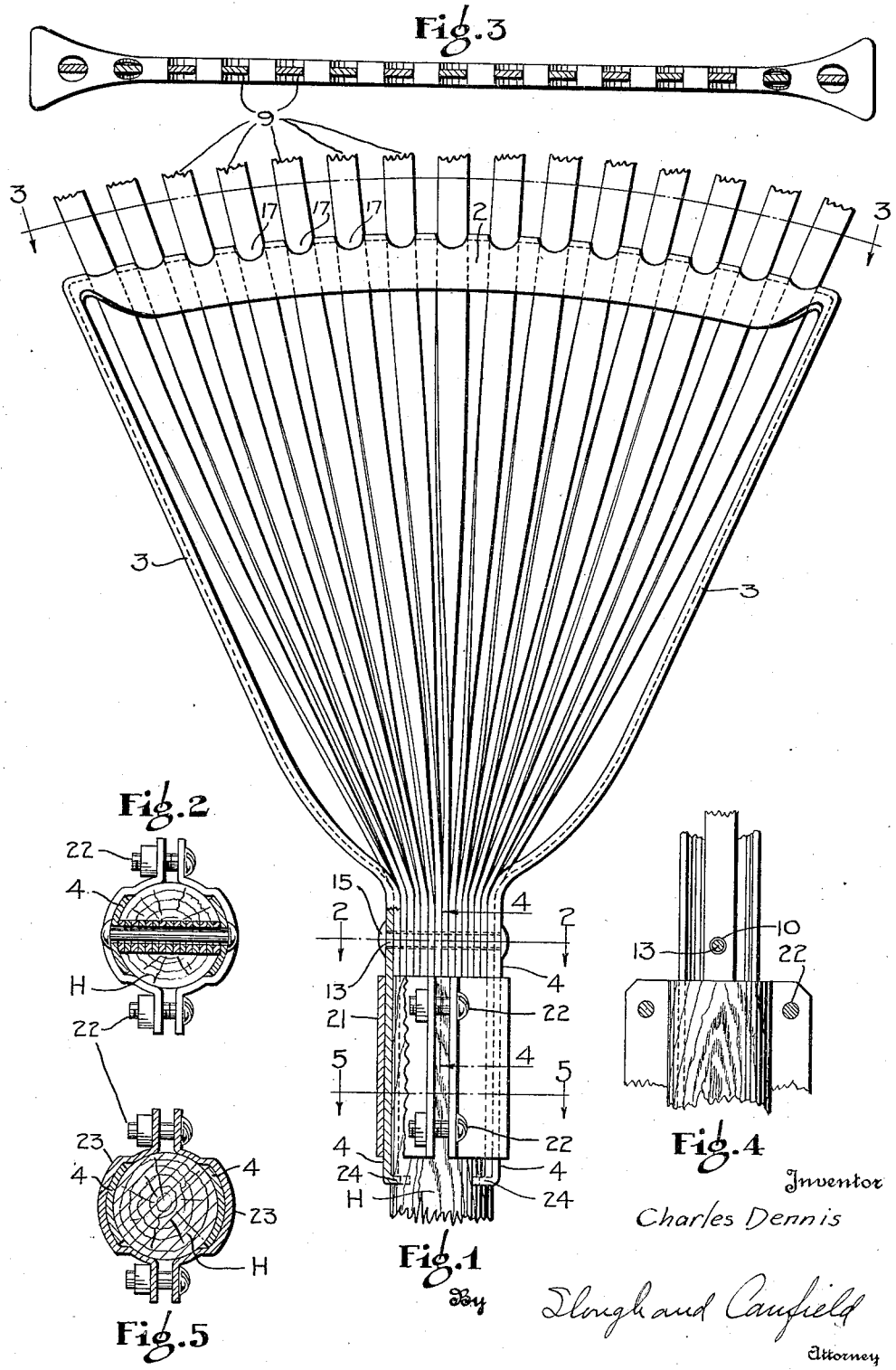
Inventor
Charles Dennis
By Slough and Canfield
Attorney Patented Sept. 27, 1932

1,879,925

UNITED STATES PATENT OFFICE

CHARLES DENNIS, OF JACKSON, MICHIGAN, ASSIGNOR TO THE AMERICAN FORK & HOE COMPANY, OF CLEVELAND, OHIO, A CORPORATION OF OHIO

RAKE

Application filed March 14, 1930. Serial No. 435,788.

My invention relates to rakes and relates more particularly to rakes which may be operated after the manner of a broom by the operator standing upright.

A particular object of my invention is to provide an improvement in rakes of the general type illustrated in the patent to Floyd E. Conley, No. 1,680,593, dated August 14, 1928, for broom rakes. The rake shown in the Conley patent employs flat steel tines extending divergently from the head of the rake where the tines are bunched and, to prevent endwise improper movement of the tines relative to the head, each of the tines are notched to receive a projection of the head extending within notches of the bunched tines.

An object of my present invention, therefore, is to provide a rake of the above general character, wherein the tines are held against improper longitudinal movement by improved means.

Another object of my invention is to provide a rake of the above general character employing tines twisted intermediate their ends, adapted to reenforce the tines against undue flexure intermediate their ends.

Other objects of my invention and the invention itself will become apparent by reference to the following description of an embodiment of my invention, and from the drawing illustrating the same embodiment.

Referring to the drawing:

Fig. 1 is a plan view of a rake embodying my invention;

Fig. 2 is a section taken on the line 2—2 of Fig. 1;

Fig. 3 is a section taken on the line 3—3 of Fig. 1;

Fig. 4 is a central cross-sectional view of a portion of Fig. 1;

Fig. 5 is a section taken on the line 5—5 of Fig. 1.

Referring to the different figures of drawing in all of which like parts are designated by like reference characters, the rake handle is shown at H and the head is shown as being formed of a sheet metal strip comprising preferably integral channeled parts 2, 3 and 4, which are bent into the form of loop shown.

The cross head frame thus provided has a pair of channeled arms 3 extending divergently from the two sides of the end of the handle H against which it is tightly clamped by the sheet metal clamp 21, whose upturned ends are pierced to receive bolts 22 projected through aligned perforations of the opposing ends of the clamp.

The clamp is formed as best shown in Fig. 5 with intermediate offset arcuately channeled portions 23 disposed on the two opposite sides of the rake adapted to receive therebetween and the handle H, the ends of the arms 4, which, as shown in Fig. 1, are provided with very short inturned ends 24, which project into the wood material of which the handle H is made, to prevent dislodgement of the head longitudinally from the end of the handle.

The divergent arms 3 are bowed in cross-sectional form to form a shallow longitudinal channel extending longitudinally thereof to accomplish stiffening of the side arms. The cross head 2 extends integrally between the forward ends of the arms 3, and the cross-sectional form of the cross head is preferably of V-form and is pierced at intervals to provide elongated openings along the ridge of the V-section cross head to permit the flat spring steel rake tines 9 to be projected therethrough.

Preferably a large number of flat rake tines 9 will be provided, these being relatively thin and long, and twisted intermediate their ends between the cross head 2 and the bolt 15 in such a way as not to fracture the steel material of the tines, but to stiffen the tines in the twisted portion, which in the embodiment illustrated, is disposed within the frame 2, 3, 4, rearwardly of the cross head 2.

The tines are projected forwardly of the cross head and are preferably provided with downturned tips after the manner of the tines shown in the aforesaid Conley patent, though this is not essential.

The tines project through the apertures 17 of the cross head and converge towards their inner ends 12. Their ends are pierced as illustrated in Figs. 2 and 4, at 10, to receive a bolt 13 projected through apertures of all of the tines and through aligned apertures of the rake head side arms 4, the bolt being suitably headed as shown at 15, on the outer surfaces of said side arms.

The rake above described is sightly in appearance, is efficient in use, and being manufactured practically entirely of sheet metal, is inexpensive to make, and the parts are very durable in service.

Having thus described my invention in a particular embodiment, I am aware that numerous and extensive departures may be made from the embodiment herein illustrated and described but without departing from the spirit of my invention.

I claim:

1. In a rake, the combination of a head, a handle supporting the head, said head including a pair of side arms and a cross bar, means securing said side arms at an end of each to the handle, a plurality of elongated flat steel tines twisted intermediate their ends to form longitudinally disposed portions arranged in planes substantially at right angles each to the other, one of said end portions for each tine disposed in converged relation between the side arms of the frame adjacent the end of the handle and means comprising a clamping rod carried by the frame side arms and projected through an aperture of each of said tines to clamp the tines together laterally and to prevent longitudinal movement of the tines relative to the head to form spaced substantially parallel rake head supports provided with concave opposite confronting surfaces embracing the handle.

2. A rake comprising a handle, a pair of side arms extending divergently therefrom, a rod extending between and secured to said side arms, a plurality of rake tines extending divergently between said divergent side arms and having parallel inner end perforated portions, a bolt extending through said side arms and the perforations of the said end portions, and the openings, provided by piercing said tines, and a cross piece joining the outer ends of said arms, and holding said tines in laterally spaced relation thereat.

3. A rake comprising a handle, a pair of side arms extending divergently therefrom, a rod extending between and secured to said side arms, a plurality of rake tines extending divergently between said divergent side arms, each being perforated in parallel end portions, a bolt extending through said side arms and perforations and clamping the end portions between the side arms, a cross piece joining the outer ends of said arms, holding said tines in laterally spaced relation thereat, said cross piece and said side arms being integrally formed of sheet metal, said tines passing through aligned elongated apertures of said cross piece.

4. A rake comprising a handle, a pair of side arms extending divergently therefrom, a rod extending between and secured to said side arms, a plurality of rake tines extending divergently between said divergent side arms, each being perforated adjacent the converged ends of the tines in parallel end portions, a bolt extending through said side arms and the perforations and clamping the end portions between the side arms, a cross piece joining the outer ends of said arms, said cross piece having openings therethrough at intervals throughout its length, each of said tines being projected through a different one of said openings and twisted intermediate the cross piece and said bolt, holding said tines in laterally spaced relation thereat.

5. A rake comprising a handle and a substantially triangular sheet metal head, having an arcuate transversely extending tine supporting element, a plurality of flat spring tines clamped by an end of each between the ends of the pair of side elements for said head, the side elements supporting by their other ends said transverse element, said tines twisted intermediate their supported ends and said tine supporting element of said head.

6. A rake comprising a handle, a pair of outwardly divergent supports extending forwardly from the handle, a cross-element connecting forward portions of the supports, a plurality of flat steel tines connected at inner end portions to the handle and projecting through laterally spaced perforations in the cross-element, the cross-element being formed from sheet metal and of generally U-shape in cross-section, the perforations being disposed in the bottom of the U and the U-legs lying flat against the flat faces of the tines.

7. A rake comprising a handle, a pair of outwardly divergent supports extending forwardly from the handle, a cross-element connecting forward portions of the supports, a plurality of flat steel tines connected at inner end portions to the handle and projecting through laterally spaced perforations in the cross-element, the cross-element being formed from sheet metal and of generally U-shape in cross-section, the perforations being disposed in the bottom of the U and generally of curved periphery and the U-legs lying flat against the flat faces of the tines.

8. In a broom rake, the combination with a handle of a generally triangular shaped cross head, provided with a generally arcuate apertured base, a plurality of tines adapted to be projected through the said apertures, the inner ends of said tines being disposed in parallel planes and in abutting relationship with each other and maintained in this relationship by means abutting the exterior faces of the side arms adjacent the handle portion.

In testimony whereof I hereunto affix my signature this 1st day of March, 1930.

CHARLES DENNIS.